Nov. 5, 1957  F. G. PRESNELL  2,811,979
SHUTTLE VALVE
Filed Feb. 24, 1955  2 Sheets-Sheet 2
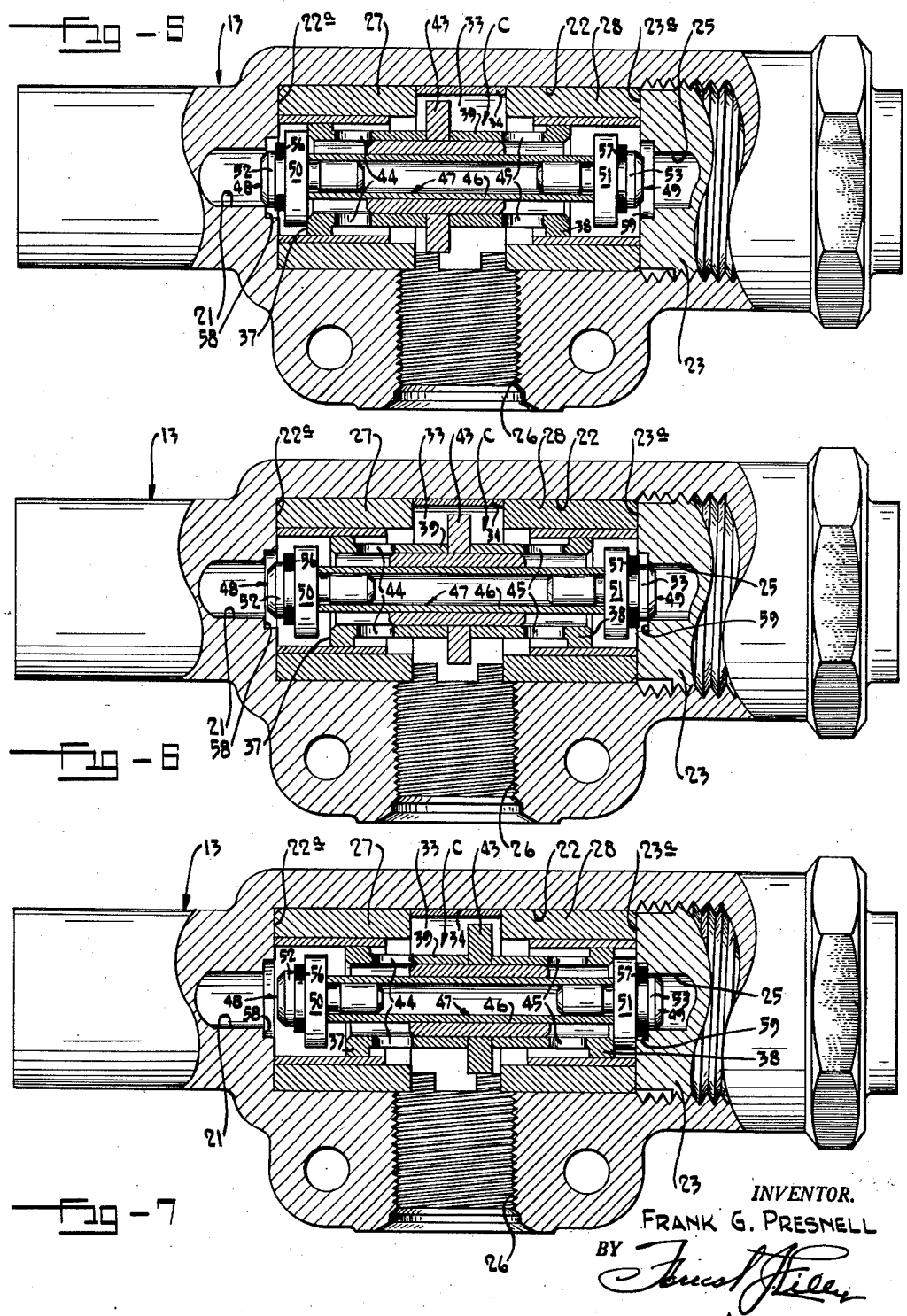
INVENTOR.
FRANK G. PRESNELL
BY
ATTORNEY

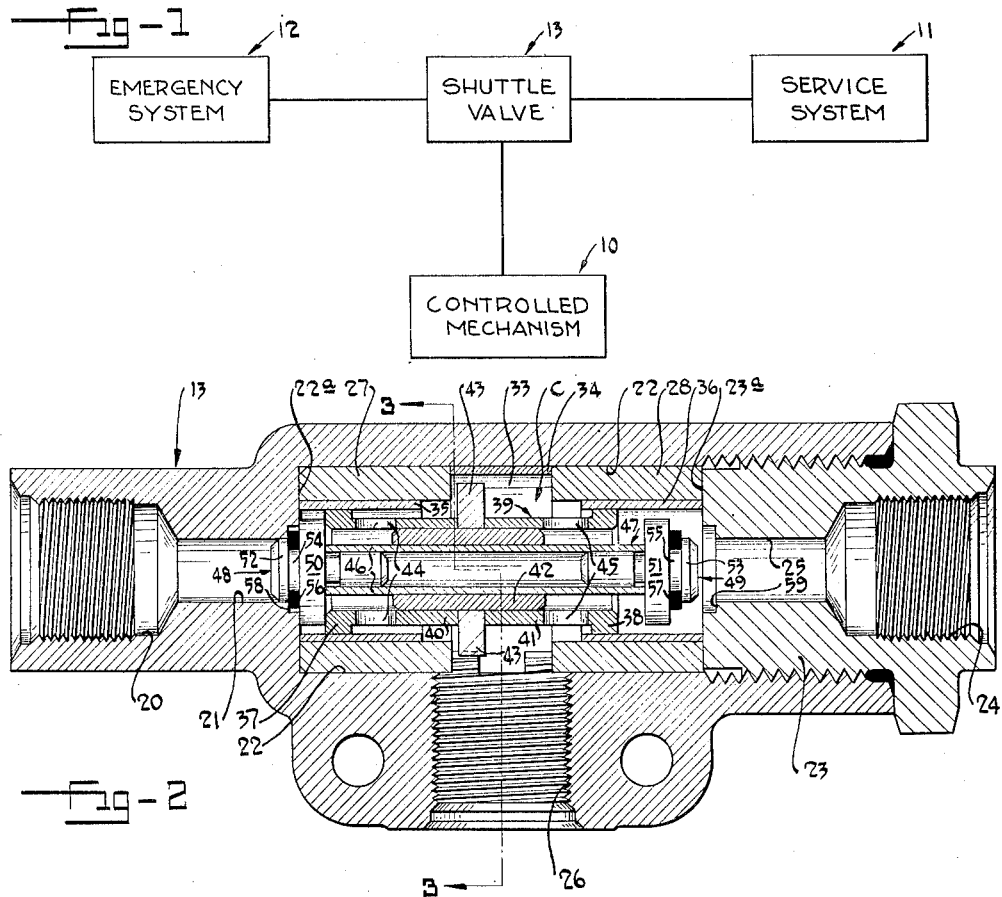

United States Patent Office 2,811,979
Patented Nov. 5, 1957

2,811,979

SHUTTLE VALVE

Frank G. Presnell, Hollywood, Calif.

Application February 24, 1955, Serial No. 490,266

11 Claims. (Cl. 137—112)

This invention relates generally to valves and more particularly to shuttle valves such as may be employed, for example, for coupling a pair of independently operable fluid pressure systems to a common fluid actuated mechanism for control of the latter by a selected one of the systems.

In numerous applications of fluid actuated mechanisms, it is conventional to employ a dual fluid pressure system of control for the mechanism. Thus, in one illustrative example, there is provided a service pressure fluid supply and an associated service pressure fluid system for controlling the mechanism during normal operation and an emergency pressure fluid supply and an associated emergency fluid pressure system for controlling the mechanism in the event of maloperation of the service system. Such a control arrangement generally employs a shuttle valve for separating the emergency and service systems at the point of their common connection to the mechanism to be controlled. The valve functions, upon operation of a selected one of such systems, to automatically communicate the selected system to the mechanism and seal off the other system.

The conventional shuttle valve includes a cylinder having at one end a port for communication with the service system, at the other end a port for communication with the emergency system, a middle port for communication with the fluid actuated mechanism to be controlled, and a shuttle spool movable in the cylinder to communicate either of the end ports with the center port. Upon shifting of control from the service system to the emergency system, for example, emergency fluid (hydraulic or pneumatic) entering the emergency port acts on the shuttle spool to move the latter from its normal position, wherein it seals off the emergency system from the middle port to a position wherein it seals off the service system from the middle port and the latter is communicated with the emergency system.

One of the most serious disadvantages of prior shuttle valves was their inability to shuttle promptly against a blocked fluid line. Thus, when shuttling against a blocked line, say a blocked service system line, the shuttle spool would undergo rapid movement until the service port had been sealed off from the middle port whereupon trapped fluid would bring the shuttle spool to a sudden and substantially complete stop. Further movement of the shuttle spool could occur only as a result of leakage, between the shuttle spool and cylinder wall, of the trapped fluid displaced by the shuttle spool. Since the shuttle spool had a close sliding fit within the cylinder, the rate of such leakage, and hence the rate of further shuttle spool movement, was very slow. Owing to the fact that in such conventional shuttle valves, the length of the shuttle spool must be such that one end port has to be sealed off before the other is freely communicated with the middle port, a delay of several seconds might occur before the shuttle spool had moved sufficiently to establish free communication between the emergency port and the middle port.

Various arrangements have been proposed for overcoming such inability to promptly shuttle against a blocked line. Thus, in one such arrangement, a dump valve was provided which vented the service line when emergency fluid was applied to the shuttle valve. These prior arrangements have, however, been excessively complex and costly to manufacture.

The general object of this invention is, therefore, the provision of an improved shuttle valve wherein the shuttle is capable of prompt shuttling between its extreme positions.

Other objects of the invention pertain to the provision of a shuttle valve which is sure and effective in its operation, and whose shuttle is operative to rapidly provide free communication between a given end port of the valve and the middle port even upon shuttle movement against a blocked line leading to the other end port of the valve.

The invention will be best understood by referring now to the following detailed description of a present illustrative embodiment thereof, reference being had therein to the acompanying drawing in which:

Fig. 1 is a diagrammatic showing of an illustrative fluid pressure system embodying the present shuttle valve;

Fig. 2 is a longitudinal sectional view of the shuttle valve of the present invention with the shuttle spool parts thereof shown in one of their extreme positions;

Fig. 3 is a section taken substantially along the line 3—3 of Fig. 2;

Fig. 4 is a perspective view of a magnet;

Figs. 5 and 6 are sections of the present shuttle valve with the shuttle spool parts thereof shown during their transition from one extreme position to the other extreme position; and Fig. 7 is a sectional view of the present valve with the shuttle spool parts thereof shown in the other extreme position.

Referring now to the drawings and more particularly to Fig. 1 thereof, wherein a shuttle vave embodying the features of this invention is shown in one type of fluid pressure system in which it finds application, 10 designates a fluid actuated mechanism adapted to be powered by pressure fluid selectively received from a service system 11 or an emergency system 12. Under normal operating conditions, the shuttle valve 13 of the invention is operative to communicate service system 11 to the mechanism 10. In the event of maloperation of service system 11, valves (not shown) within emergency system 12 may be operated to communicate the emergency system with shuttle valve 13, the latter being responsive to the pressure of emergency fluid from system 12 to seal off service system 11 and communicate emergency system 12 to the mechanism 10, all in a manner hereinafter more fully described.

Reference now being had to Fig. 2, the shuttle valve 13 of this invention comprises an elongated valve body having an internally threaded bore 20 extending axially into one end thereof and forming a port for communication, in the illustrative system of Fig. 1, with emergency fluid pressure system 12. Bore 20 is continued by a relatively reduced bore 21 which, in turn, is continued by a relatively enlarged bore 22, opening through the other end of the valve housing.

A nipple 23 is screwed into the threaded end of bore 22, and has a threaded bore 24 forming a second valve port for communication, in the illustrative example of Fig. 1, with service pressure fluid system 11. Bore 24 is continued by a relatively reduced bore 25 which opens into bore 22. A threaded bore 26 extending into the valve body communicates with the middle of bore 22, and is connected with the fluid actuated mechanism 10 in Fig. 1. The bore 22, together with shoulder 22a at its juncture with bore 21, and the inner face 23a of nipple 23, affords a cylindrically shaped shuttle valve chamber C.

Disposed within chamber C at opposite ends thereof are a pair of permanent magnets 27 and 28 each of which, as more clearly shown in Fig. 4, is cylindrical in form and slotted as at 29 to provide a plurality of magnetic poles 30. Magnet 27 is located in abutment with shoulder 22a and magnet 28 in abutment with face 23a. The combined length of magnets 27 and 28 is somewhat less than the axial distance between shoulder 22a and end face 23a so as to form a clearance space 33 between their adjacent ends, a spacing sleeve 34 being placed between them, as shown.

Fixed within the magnets 27 and 28 are sleeve bearings 35 and 36, respectively, which slidably receive enlarged heads 37 and 38, respectively, formed at opposite ends of a shuttle sleeve generally designated at 39.

Shuttle sleeve 39 comprises a pair of sleeve elements 40 and 41 having the aforementioned heads 37 and 38, respectively, formed thereon, and a bushing 42 on which the adjacent end portions of said sleeve elements 40 and 41 are tightly mounted. The adjacent ends of sleeve elements 40 and 41 are spaced from one another, and a magnetic armature 43 is mounted on bushing 42 between them, as shown.

The outer diameter of armature 43 is somewhat less than the diameter of bore 22 but somewhat greater than the internal diameter of the cylindrical magnets 27 and 28, so that the armature is movable in clearance space 33 upon axial movement of the shuttle sleeve 39. Sleeve elements 40 and 41 are provided adjacent their respective heads 37 and 38, with fluid ports 44 and 45, for a purpose hereinafter set forth.

Slidably fitted within bushing 42 is a sleeve 46 forming the stem of the main shuttle generally indicated at 47. A pair of shuttle valve heads 48 and 49 are fixed within opposite ends of sleeve 46, as by being provided with reduced stems press-fitted into place, as shown. These shuttle valve heads 48 and 49 comprise enlarged head portions or disks 50 and 51, respectively, and reduced beveled tip portions 52 and 53, respectively, of a diameter to be slidably received in the adjacent bores 21 and 25. The enlarged head portions and reduced tip portions of the shuttle heads are joined by reduced neck portions 54 and 55 carrying packing rings 56 and 57, respectively. The head disks 50 and 51 will be seen to be annularly spaced inside the sleeve bearings 35 and 36, and to be engageable by the headed extremities of the shuttle sleeve 39.

The entire assembly thus far described is so constructed and arranged that the axis of shuttle 47 is alined with the axes of bore 21 in the valve body and bore 25 in nipple 23, whereby packing ring 56 may, upon left hand movement of the shuttle 47, move into sealing engagement with a valve seat 58 formed by a countersink at the end of bore 21, and packing ring 57 may, upon right hand movement of the shuttle, move into sealing engagement with a valve seat 59 formed by a countersink at the end of bore 25. The shuttle sleeve heads 37 and 38 are engageable, by relative movement of the shuttle sleeve 39 on shuttle 47, with shuttle head disks 50 and 51, respectively, and they function as valve members controlling fluid flow between the shuttle heads and shuttle sleeve heads.

Magnetic pull from magnet 27, or magnet 28, as the case may be, on armature 43 holds the corresponding shuttle sleeve head against the associated shuttle head, for instance, sleeve head 37 against shuttle head disk 50, and in turn holds the shuttle head disk bottomed on the opposed end surface of the shuttle chamber C. The armature 43 is dimensioned to preserve a slight gap between it and the magnets, so that bottoming will take place as described. Relative motion between shuttle 47 and shuttle sleeve 39 is approximately the same as the stroke of shuttle 47, so that the total travel of sleeve 39 is about twice that of shuttle 47.

With the parts of the valve positioned as shown in Fig. 2, pressure fluid may, upon operation of service system 11 of Fig. 1, enter through port 24, flow past the separated valve seat 59 and shuttle head 49, around the disk 51 of shuttle head 49, through ports 45, and into middle port 26 whence it will be conveyed to the pressure mechanism 10 of Fig. 1. In this position of the shuttle elements, and with fluid flow in the direction indicated above, packing 56 is retained in sealing engagement with valve seat 58 and shuttle sleeve head 37 is held in contact with shuttle disk 50 by virtue of the pressure of the fluid entering through port 24 and also due to the attractive force of the permanent magnet 27 on the magnetic armature 43.

During operation of the service system, or the emergency system, fluid flow may also be in a reverse direction. Thus, the fluid flow may be from mechanism 10, through middle port 26 and back to the service system through port 24. In this latter direction of flow, the sum of the hydrostatic and hydrodynamic forces may be such as to tend to move the shuttle and shuttle sleeve toward the open end port whereby the shuttle parts will be retained in their sealing position at the emergency port solely by the action of the magnetic detent arrangement.

In the event of malfunctioning of the service system 11 of Fig. 1, caused, for example, by blockage in the conduit conveying pressure fluid from system 11 to port 24 of the shuttle valve, emergency system 12 will be actuated by the operation of suitable valves (not shown) within the system whereby pressure fluid from emergency system 12 will flow into port 20 of shuttle valve 13. This pressure fluid acts on tip 52 of shuttle head 48, shifting the shuttle 47 and shuttle sleeve 39 to the right.

Upon unseating of shuttle head 48 from its associated valve seat 58, fluid flows around the shuttle head, and the pressure fluid acts against the entire effective end surface of shuttle head 48 and also against the exposed portion of the end surface shuttle sleeve head 37 (see Fig. 5). Owing to the attractive force of permanent magnet 27 on armature 43, the frictional resistance to movement of shuttle sleeve 39, and the inertia of the shuttle sleeve, shuttle sleeve head 37 remains in contact with disk 50 during such travel toward the right, thus preventing flow of pressure fluid between shuttle head 48 and shuttle sleeve 39.

If the line connected to port 24 were not blocked, as assumed above, the shuttle would continue its travel toward the right until its head disk 51 has bottomed on surface 23a. The shuttle sleeve, thus carried to the midpoint of its travel toward the right, continues toward the right by virtue of the fluid pressure exerted against its head 37; and when past the midpoint, is pulled through the balance of its travel by the magnet 28.

Assuming, however, the line connected to port 24 to be blocked, the following sequence of events takes place. Upon entrance of tip 53 of shuttle head 49 into bore 25, the service port 24 is substantially sealed off (Fig. 6), and the fluid trapped therein brings the shuttle 47 to a sudden and substantially complete stop. Continued movement of the shuttle 47 can occur only very slowly by the leakage of trapped fluid between tip 53 and the wall of bore 25.

Emergency pressure fluid acting on the exposed end surface of shuttle sleeve head 37, aided to some extent by momentum of the shuttle sleeve, will, however, cause continued unimpeded movement of the shuttle sleeve 39 to the right, thus separating the shuttle sleeve head 37 from shuttle head disk 50, and opening a flow path from emergency port 20 to outlet 26 past the shuttle head 48, i. e., through the space between the separated shuttle head 48 and valve seat 58, and between the now separated shuttle head disk 50 and shuttle sleeve head 37, thence through ports 44 into the chamber space outside the shuttle sleeve, and finally to the middle port 26.

The gap between the separating shuttle sleeve head 37 and shuttle head disk 50 is at first relatively small, and pressure drop across it is high, assuring continued pressure against the sleeve head sufficient to carry it to a position somewhat beyond that illustrated in Fig. 6. As the sleeve continues to move, the gap widens, and the pressure drop diminishes; but when the armature has passed the midpoint of its travel, it is closer to magnet 28 than to magnet 27, so the stroke of the sleeve may be completed by both pressure drop and magnetic pull. Completion of shuttle and shuttle sleeve movement to the right is accomplished, in the case of a low volume emergency system, such as a hand pump, mainly as a result of the attractive force of magnet 28 on armature 43 and, in the case of a high volume emergency system, by virtue of the pressure drop across the gap between the shuttle head 48 and shuttle sleeve and by magnetic attraction. These forces cause movement of the shuttle until packing 57 is in sealing engagement with seat 59 and shuttle head disk 51 is in engagement with surface 23a, and movement of shuttle sleeve 39 until its head 38 has engaged disk 51 of shuttle head 49 (Fig. 7). Until the movement, to the right, of the shuttle sleeve is completed by engagement with shuttle head disk 51, a gap exists between the sleeve and shuttle head. Fluid displaced by movement of the shuttle sleeve can escape via this gap, ports 45 and middle port 26, so that no trapping of fluid can occur.

From the foregoing it will be apparent that the present shuttle valve is operative to provide communication between one end port and the middle port immediately upon shuttle movement being arrested by sealing off of the other end port. Thus, an end port may be promptly communicated with the middle port even upon shuttling of the valve against a blocked line. It will also be apparent that while only a magnetic detent arrangement has been disclosed, other arrangements, such as mechanical detents, may be employed for retaining the shuttle sleeve in its sealing positions with the shuttle.

The specific embodiment of the invention here shown for illustrative purposes will, of course, be understood to be merely illustrative in nature and not restrictive on the invention, various changes in design, structure, and arrangement being possible without departing from the spirit and scope of the invention as defined in the appended claims.

I claim:

1. A shuttle valve comprising: a valve body having therein a shuttle valve chamber and provided with opposite end ports and a middle port, shuttle means reciprocable in said chamber for selectively communicating either one of said end ports with the middle port, said means including a reciprocable main shuttle having valves at opposite ends for selectively initially closing one or the other of said end ports, said main shuttle being exposed to pressure fluid communicated to either one of said end ports and movable thereby in a direction to close the opposite end port, and said shuttle means including also an auxiliary shuttle having valve elements cooperable with said main shuttle, said auxiliary shuttle being limitedly reciprocable relative to said main shuttle and normally biased to a limiting position, relative to said main shuttle, in which it acts as a closure in a flow path from the initially closed end port to said middle port, said auxiliary shuttle having oppositely facing surface areas exposed to pressure fluid in opposite ends of said chamber, said auxiliary shuttle being movable as a unit with and by said main shuttle, while in said limiting position relative thereto, toward said opposite end port, and being movable from said limiting position relative to said main shuttle by pressure of fluid admitted from the initially closed end port to the corresponding end of said chamber to open said flow path upon stoppage of said main shuttle in course of its travel to close said opposite end port.

2. A shuttle valve comprising: a valve body having a valve chamber therein provided with opposite end ports and a middle port, a main shuttle reciprocable in said chamber between stroke limits along a longitudinal axis and having valve means at its opposite ends for alternately closing said end ports by said reciprocation, said shuttle also having at an end thereof corresponding to one of said end ports an axially inwardly facing valve seat, there being a fluid flow path between said one end port and said middle port that extends past the corresponding shuttle valve means and across said valve seat, and an auxiliary shuttle reciprocable in said chamber between stroke limits relative to said main shuttle and including a valve element adapted to engage said valve seat at one limit of such reciprocation to close said fluid path, said main shuttle being movable from a position closing one of said end ports toward said other end port by pressure fluid introduced through said one end port, and said auxiliary shuttle being correspondingly movable with and by said main shuttle with said valve seat on said main shuttle and said valve element on said auxiliary shuttle in engagement with one another, said auxiliary shuttle including an axially outwardly facing surface exposed to said pressure fluid entering the corresponding end of said chamber through said one end port after opening thereof by movement of said shuttle, and said auxiliary shuttle being further movable by said pressure fluid, after arresting of said main shuttle, to separate its valve element from said valve seat and thereby open said flow path.

3. A shuttle valve comprising: a valve body having a valve chamber therein provided with opposite end ports and a middle port, a main shuttle reciprocable in said chamber between stroke limits along a longitudinal axis and having valve means at its opposite ends for alternately closing said end ports by said reciprocation, said shuttle also having at each end thereof an axially inwardly facing valve seat, there being fluid flow paths between each of said end ports and said middle port extending past the respective shuttle valve means and across said valve seats, and an auxiliary shuttle reciprocable in said chamber between stroke limits relative to said main shuttle and including at each end thereof a valve element adapted to seat on the respective main shuttle valve seat at the limits of its travel relative to the main shuttle, whereby to close one or the other of said flow paths, means for biasing the auxiliary shuttle toward the nearest end of said chamber, said main shuttle being movable from a stroke limit position closing either one of said end ports toward the opposite end port by pressure fluid introduced through said one end port, said auxiliary shuttle being correspondingly movable with and by said main shuttle toward said opposite end port with the valve element of said auxiliary shuttle seated on the main shuttle valve seat, and said auxiliary shuttle including surfaces facing axially outwardly towards the chamber ends, each of which is adapted to be exposed to pressure fluid entering via a corresponding end port whereby pressure is exerted on the auxiliary shuttle to urge it to travel in the same direction of movement as the main shuttle, said auxiliary shuttle being further movable by said pressure fluid, after arresting of said main shuttle, to separate its valve element from the corresponding main shuttle valve seat to open said flow path from said initially closed end port to said middle port.

4. A shuttle valve comprising: a valve body having a valve chamber therein including bores at opposite ends thereof, said chamber having a mid-port and opposite end ports communicating with the outer ends of said bores, a main shuttle reciprocable in said chamber between stroke limits along a longitudinal axis and having valve elements at its opposite ends for alternately blocking said end ports by said reciprocation, a shuttle sleeve reciprocable longitudinally on said main shuttle and engageable at each of its stroke limits relative to said main shuttle with an abutment on said main shuttle, said sleeve having opposite end portions slidably received and sealed within said chamber bores, said end portions of said sleeve having end surfaces exposed to pressure fluid admitted to the ends of said chambers, and said shuttle sleeve being ported to communicate with the mid-portion of said chamber and said mid-port, there being annular valve seats on opposite end portions of said main shuttle engageable by annular valve elements on opposite end portions of said shuttle sleeve when the shuttle sleeve is in its limiting positions with respect to the main shuttle, and yielding means biasing the shuttle sleeve to move toward the nearest end of said chamber.

5. The subject matter of claim 4, wherein said yielding biasing means comprises magnets mounted at opposite end portions of said chamber and an armature medially mounted on said shuttle sleeve.

6. A shuttle valve comprising: a body, a chamber therein including piston bores at opposite end portions thereof, two end ports and a mid-port communicating with said chamber from the exterior of said body, a pressure-responsive primary shuttle longitudinally movable between end positions, said shuttle having valve elements at its opposite ends adapted to selectively block communication between said chamber and one or the other of said end ports, secondary shuttle means including a member longitudinally movable in respect to both said body and said primary shuttle, means limiting longitudinal movement of said secondary shuttle means in respect to said primary shuttle, said secondary shuttle means having end positions in respect to said body reached when said primary shuttle is shifted to one or the other of its end positions and the secondary shuttle means is shifted in the same direction to the limit of its travel relative to the primary shuttle, yielding means interacting between said body and said secondary shuttle means, biasing said secondary shuttle away from mid-position in respect to said body towards the nearest of the secondary shuttle's end positions in respect to said body, said secondary shuttle means including oppositely positioned piston elements longitudinally slidable in said piston bores of said body chamber, each piston element sealing to its chamber bore between the adjacent end portion of said chamber and the mid-portion thereof, there being fluid passages communicating between opposite sides of each of said piston elements, the primary shuttle and secondary shuttle means being cooperatively constructed and arranged so as, upon the secondary shuttle means occupying a position at the limit of its travel in respect to the primary shuttle, to block said fluid passage between opposite sides of the one of said piston elements adjacent the end port towards which, in respect to the primary shuttle, the secondary shuttle means moves in approaching said limit of its travel in respect to the primary shuttle, and oppositely facing areas on said secondary shuttle means, each of which is subject to the fluid pressure existing in the adjacent chamber end.

7. A shuttle valve comprising: a body defining a chamber with spaced pressure inlet ports and a work port between said inlet ports; shuttle means disposed in said chamber to control communication between said pressure inlet ports and said work port, said shuttle means having first and second members movable relative to each other and to said body, said members being shaped to provide fluid passages for establishing communication between said pressure inlet ports and said work port; cooperative means on said first member and said body to alternately close said fluid passages upon predetermined movement of said first member relative to said body; additional cooperative means on said first and second members to also alternately close said fluid passages upon predetermined relative movement of said first member relative to said body; additional cooperative means on said first and second members to also alternately close said fluid passages upon predetermined relative movement of said members, the introduction of fluid pressure to the inlet port communicating with the closed fluid passage serving to move said members to open such passage and close the other passage; and means to delay the opening of the passage closure formed by the additional cooperative means on said first and second members for a predetermined time after the opening of the passage closure formed by the cooperative means on said first member and said body.

8. The subject matter of claim 1, wherein said auxiliary shuttle is biased by yielding means tending to move the shuttle toward the nearest end of said chamber.

9. The subject matter of claim 8, wherein said biased auxiliary shuttle engages said main shuttle to bias it toward its corresponding stroke limit within said chamber.

10. A shuttle valve comprising: a valve body having a longitudinal valve chamber therein including longitudinal piston bores adjacent opposite ends thereof, there being opposite end ports in said body communicating with opposite ends of said chamber, and a middle port communicating with the mid-portion of said chamber, a main shuttle means in said chamber reciprocable longitudinally therein between fixed end limits, a primary valve element on each end of said main shuttle means for selectively alternately closing one end port and opening the other, secondary valve elements on said main shuttle means adjacent opposite ends thereof, auxiliary shuttle means reciprocable longitudinally in said chamber between opposite end positions relative to said body and movable between fixed stroke limits relative to said main shuttle means, said auxiliary shuttle means comprising piston elements slideably fitted in said piston bores and sealed thereto between the adjacent end portion of the chamber and the mid-portion thereof, said piston elements being formed with fluid passages extending between adjacent end portions of the chamber and the mid-portion thereof, valve seats around said fluid passages, said valve seats and said secondary valve elements of said main shuttle means being arranged for cooperation to selectively close said passages when said secondary shuttle means is positioned at one or the other of its stroke limits relative to the main shuttle means, thereby selectively blocking fluid paths from the corresponding end portions of said chamber to the mid-portion thereof, said fluid passages of said piston elements being opened by separation of said valve seats from said secondary valve elements on said main shuttle means when said secondary shuttle means moves from its corresponding stroke limit relative to the main shuttle means, thereby opening the blocked fluid path, there being oppositely outwardly facing areas on said secondary shuttle means exposed to the fluid pressures in the corresponding end portions of said chamber, and yielding means interacting between said valve body and said auxiliary shuttle means biasing said auxiliary shuttle means toward the nearest end position of the secondary shuttle means relative to the valve body.

11. The subject matter of claim 10, wherein said auxiliary shuttle means includes a sleeve around said main shuttle means interconnecting said piston elements, and wherein said oppositely facing areas on said secondary shuttle means are on the outer ends of said piston elements.

References Cited in the file of this patent

UNITED STATES PATENTS

| 2,311,851 | McClure | Feb. 23, 1943 |
| 2,389,667 | Hudson | Nov. 27, 1945 |
| 2,501,755 | Bent | Mar. 28, 1950 |
| 2,654,564 | Pech | Oct. 6, 1953 |

FOREIGN PATENTS

| 455,506 | Italy | Feb. 18, 1949 |